United States Patent Office 2,989,639
Patented June 20, 1961

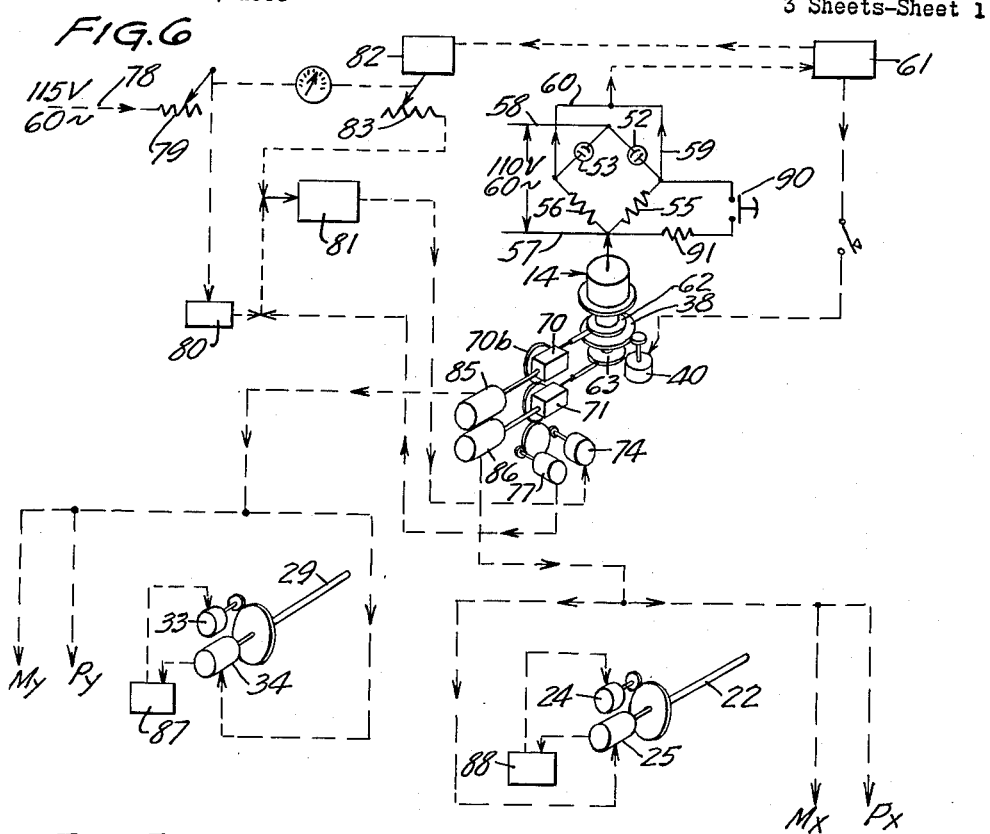
June 20, 1961  D. H. DULEBOHN ET AL  2,989,639
MASTER TRACING MACHINE
Filed Nov. 3, 1958  3 Sheets-Sheet 1
INVENTORS
DAVID H. DULEBOHN
ROBERT M. GOLD
BY Williamson, Schroeder + Palmatier
ATTORNEYS June 20, 1961 D. H. DULEBOHN ET AL 2,989,639
MASTER TRACING MACHINE
Filed Nov. 3, 1958 3 Sheets-Sheet 2
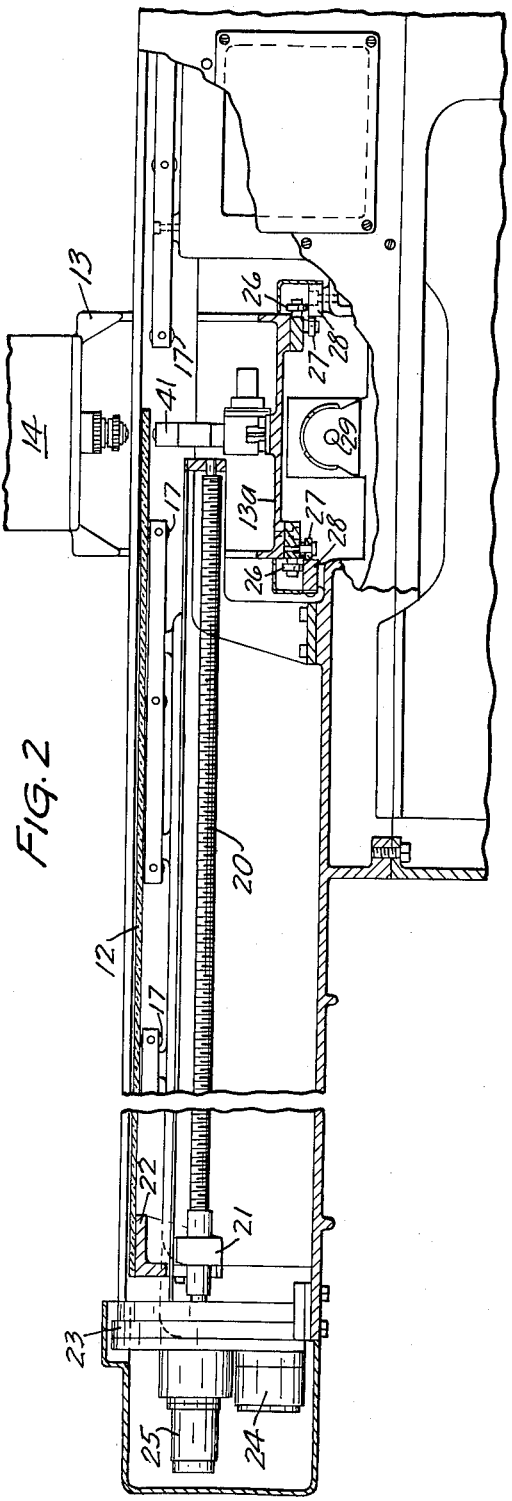
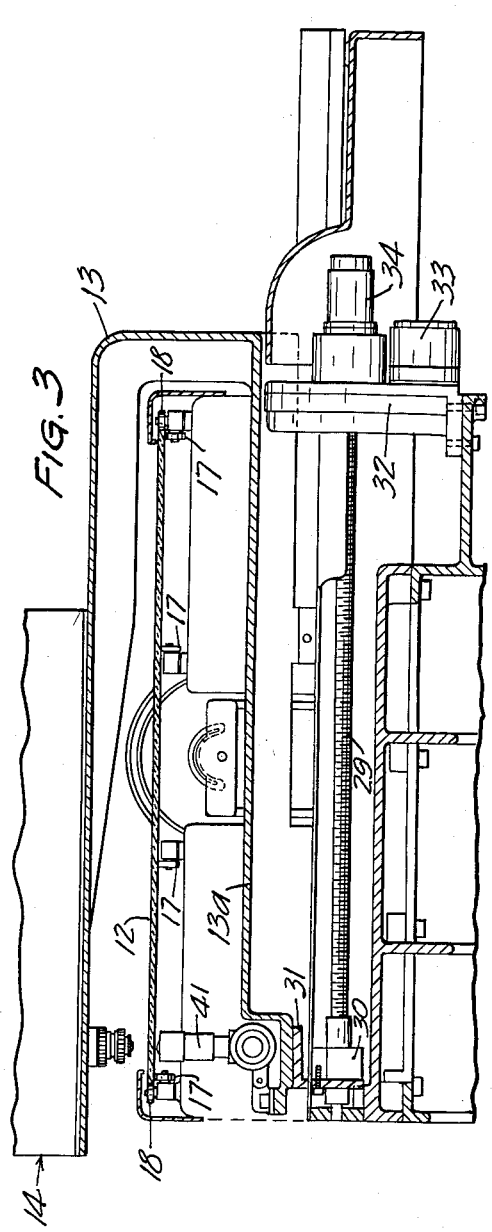
INVENTORS
DAVID H. DULEBOHN
ROBERT M. GOLD
BY
Williamson, Schroeder & Palmatier
ATTORNEYS

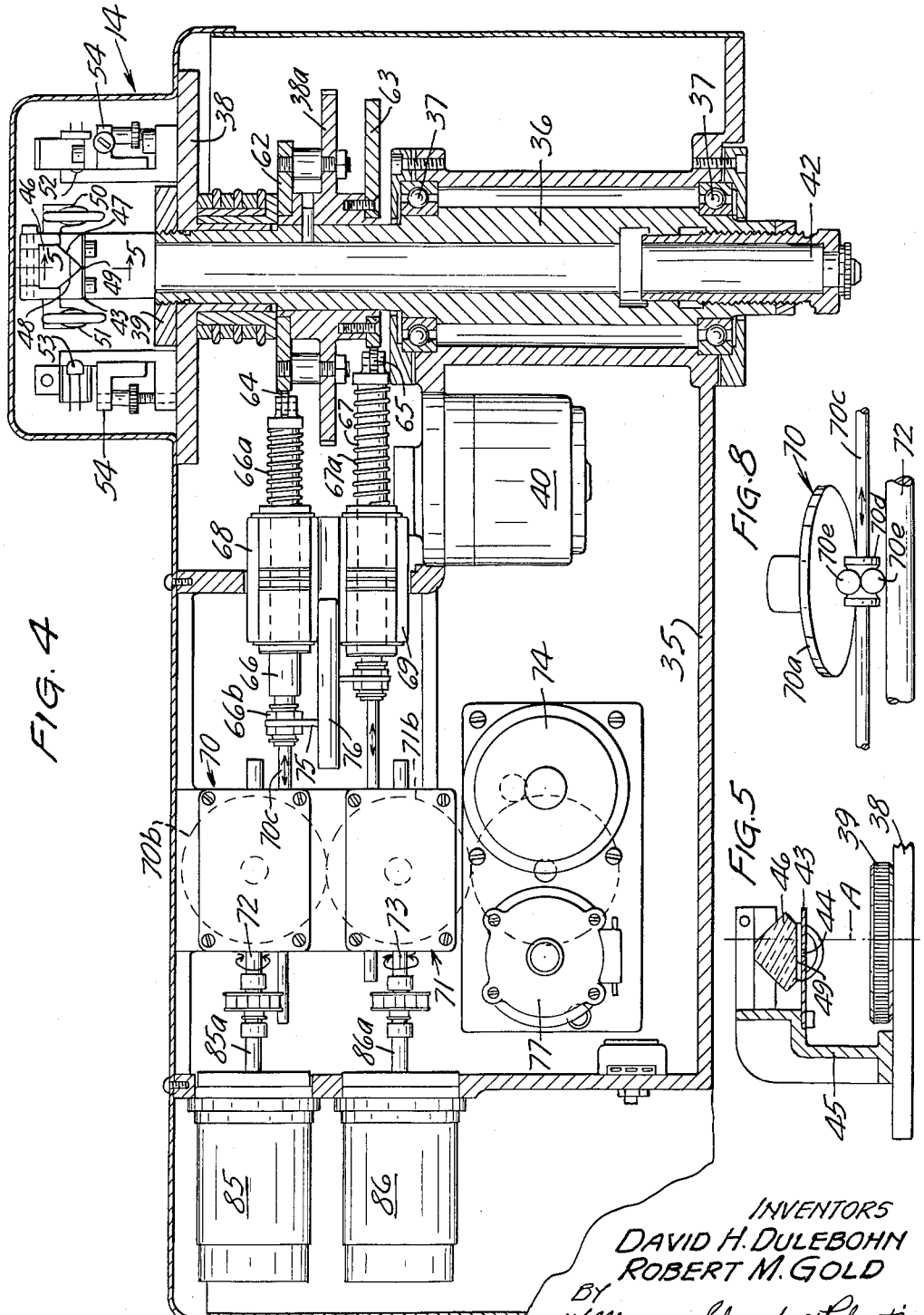

2,989,639
MASTER TRACING MACHINE

David H. Dulebohn and Robert M. Gold, Minneapolis, Minn., assignors to Dayton Rogers Manufacturing Co., Minneapolis, Minn., a corporation of Minnesota
Filed Nov. 3, 1958, Ser. No. 771,603
8 Claims. (Cl. 250—202)

This invention relates to a master tracing machine for following the contour of a template and more specifically relates to a tracing machine producing at the output thereof, signals or indications which are related to the template contour and which signals or indications may be used in controlling a slave machine for performing a function on a workpiece, such as cutting the workpiece to the identical contour of the line on the drawing.

It is recognized that tracing machines have been known in the past but it is pointed out that such tracing machines have many important disadvantages which tend to limit their usage and successfulness in commercial operations. For instance, it will be recognized that many machines which purport to trace a line drawing are extremely sensitive to the quality and width of the line on the drawing. Therefore it has been almost essential in using many tracing machines that the drawing be prepared with extreme accuracy in india ink so that the lines will have uniform width and darkness or density. In relation to sensing the position of the line on the drawing, the reflectivity of the paper has been important to the operation of the tracing machine.

It is further noted that many tracing machines in the past, have proved inadequate in their ability to accurately follow a template contour at points where the direction of the contour changes abruptly or sharply. In this regard, some tracing machines have not been able to operate the slave machine quickly enough at an abrupt change in the contour as to cause the workpiece being cut to have the identical shape of the template at the abrupt change. Some tracing machines have caused the slave machine to change direction at the workpiece too abruptly and therefore there is a danger of "hogging" or "biting" into the work.

With these comments in mind it is to the elimination of these and other disadvantages that the present invention is directed along with the inclusion therein of other novel and desirable features.

An object of our invention is to provide a new and improved master tracing machine of relatively simple and inexpensive construction and operation for following the contour of a template and causing a slave machine to operate in direct relation to said contour.

Another object of our invention is the provision of a novel master tracing machine with which drawings, of the type produced by simple and conventional drafting techniques, may be used.

Still another object of our invention is to provide an improved and novel master tracing machine which may rapidly trace along a line drawing so as to permit rapid operation by the slave machine, and which materially reduces the rate of tracing progress adjacent abrupt changes in the line direction so as to permit accurate tracing along the line at the abrupt change therein and to permit the slave machine to be accurately controlled at the point of abrupt change in direction of movement along the workpiece.

A further object of our invention is to provide a new and novel master tracing machine for controlling a slave machine in relation to the contour of a line drawing being traced, and which master tracing machine is capable of tracing a line which is spaced only a minute distance from an adjacent line without causing the operation of the tracing machine to be affected by the wrong line.

These and other objects and advantages of our invention will more fully appear from the following description made in connection with the accompanying drawings wherein like reference characters refer to the same or similar parts throughout the several views and in which:

FIG. 1 is a general perspective view of the master tracing machine;

FIG. 2 is a detail vertical section view with a portion thereof broken away and taken on a vertical plane as indicated substantially at 2—2 in FIG. 1;

FIG. 3 is a detail section view taken on a vertical plane as indicated substantially at 3—3 in FIG. 1;

FIG. 4 is a detail section view taken on a vertical plane as indicated substantially at 4—4 in FIG. 1;

FIG. 5 is a detail section view taken on a substantially vertical plane as indicated at 5—5 in FIG. 4;

FIG. 6 is a diagrammatic electro-mechanical view showing a one-line diagram of substantially all of the electrical circuitry of the machine;

FIG. 7 is a diagrammatic sketch of the optical and light system of the machine; and FIG. 8 is a diagrammatic sketch of a portion of the motion-converting resolver mechanism in the head.

One form of the present invention is shown in the drawings and is described herein. The machine which is indicated in general by numeral 10 is shown in FIG. 1 and has a supporting structure 11 which carries a template-supporting member 12 and a head-supporting carriage 13, both of which are movable on the supporting structure 11 so as to provide for permitting relative movement between the head 14 and the template 15 in multiple directions so as to facilitate following by the head along the contour 16 of the template being traced.

As more clearly seen in FIGS. 2 and 3, the template-supporting member 12 comprises a glass plate which is supported by means of a plurality of rollers 17 individually mounted on the supporting structure 11. The side edges of the template-carrying member or glass plate 12 are guided by means of four rollers 18 so as to assure that the plate 12 moves linearly in its longitudinal direction. Drive mechanism is provided for moving the glass plate 12 on the rollers 17, and in the form shown, such means includes a rotary screw 20 which is journalled in suitable bearings at its opposite ends and has a following nut 21 thereon which is affixed to the glass plate 12 by means of a bracket 22. The screw 20 is connected through a gearing mechanism contained within the housing 23 to a drive motor 24 which is a variable speed motor and which may be referred to as the X-axis drive motor. The screw 20 is also connected through the mechanism 23 to the rotor of the synchrocontrol transformer 25, the purposes of which will appear more fully hereinafter.

The head-mounting carriage 13 has a base portion 13a which extends beneath the glass plate 12 and has a plurality of rollers 26 and 27 respectively thereon which engage the top and side surfaces of tracks 28 which are affixed on the frame structure 11. The tracks extend transversely of the X-axis screw 20 so as to permit movement of the carriage 13 and head 14 along the Y-axis.

Means are provided for moving the carriage 13, and in the form shown, a Y-axis screw 29 is oriented between the tracks 28 and parallel thereto and the screw 29 is journalled in suitable bearings on the frame structure 11 at its opposite ends. A follower nut 30 is mounted on the screw 29 and is connected to the base portion 13a of carriage 13 by means of a bracket 31. The screw 29 is driven through a gearing mechanism contained within the housing 32 and is driven from a Y-axis drive motor 33. The screw 29 is also connected through the gear mechanism in the housing 32 to the rotor of the Y-axis synchrocontrol transformer 34, for purposes hereinafter more fully brought out.

It will be understood that by varying the relative movement between the template-carrying support 12 and the carriage 13, the head may be caused to follow along the contour 16 of the template which is to be traced, assuming that head 14 is pointed in the right direction.

A frame 35 is provided as a portion of the carriage 13 for mounting the rotary head 14 and the control apparatus associated with the head 14. The rotary head 14 includes a generally tubular body 36 which is journalled on a vertical axis which will normally be caused to follow along the contour 16 of the template. The tubular body member 36 is mounted on suitable bearings 37 and the body member 36 also carries a mounting plate 38 at the upper end thereof secured by means of a nut 39. The tubular body member 36 also has affixed on the outer side thereof, a drive gear 38a which is in driven relation with a head rotating motor 40 which is suitably mounted on the frame 35. The driving relation between the motor 40 and gear 38 is deleted in FIG. 4 for sake of clarity, but is clearly shown in the diagrammatic sketch FIG. 6.

Means are provided on the head 14 for sensing the direction of the contour line 16 with respect to the orientation of the head 14. In connecting with the sensing of the direction of the contour or line 16, a source of light 41, of the type to cast a small concentrated beam of light, is provided on the base portion 13a of the carriage structure and is oriented to direct the beam of light upwardly through the glass plate 12 and through the template or sheet of paper 15 thereon. The sensing means also includes a light and image-receiving and magnifying lens system or telescope 42 secured in the lower end of the tubular body member 36 and directing the image and light upwardly through the tubular body member 36 to a masking plate 43 which has a small window or opening 44 therein which is positioned in substantial alignment with the center of the beam of light or image directed upwardly by the lens system 42. The plate 43 is affixed to a bracket 45 which is affixed on the plate 38 of the head so as to rotate with the head. A prism 46 is also clamped on the bracket 45 and has a pair of reflecting surfaces 47 and 48 which are oriented obliquely with respect to each other and generally face downwardly toward the masking plate 43. The prism 46 has a knife edge 49 between the reflecting surfaces 47 and 48, and ordinarily, the knife edge 49 is oriented in alignment with the longitudinal direction of the portion of line or contour 16 being sensed, and the knife edge 49 is also in vertical alignment with the center of the window 44 in the masking plate 43 so as to split the image passing through the window 44 and cause the reflecting surfaces 47 and 48 to direct the partial images in different directions. The reflecting surfaces 47 and 48 of the prism are oriented substantially at right angles to each other and will reflect the partial images horizontally outwardly therefrom into the pair of collecting lenses 50 and 51 which are also mounted on the bracket 45 at the opposite sides of the prism 46.

Photoelectric cells 52 and 53 are mounted on adjustable brackets 54 so as to be adapted for positioning in precise alignment with the images reflected from the prism 46 and the brackets 54 are affixed to the mounting plate 38 on the head. The operation of the optical system is clearly shown in FIG. 7 wherein it is brought out that the masking plate 43 restricts the field of view and the image of the line 16 which passes through the window 44 is of such size as to allow only a fraction of the area of light on either side of the line to pass through the window along with the line image so that when the line moves to one side or the other of the window, the images which are reflected into the photocells 52 and 53 will change greatly in their quantity of light and therefore a substantial change in the resistance of the photocells will be affected.

In this regard, attention is invited to FIG. 6 wherein the photocells 52 and 53 are shown connected in adjacent legs of a bridge circuit which also includes resistors 55 and 56 in the other legs. Electrical power is supplied through the conductors 57 and 58 to the points of the bridge circuit between the cells 52 and 53 and between the resistors 55 and 56, and the output of the bridge circuit is at the conductors 59 and 60, at the other two corners of the bridge circuit. The operation of the photoelectric cells, when they become unbalanced, causes a substantial unbalancing of the bridge circuit, and the effect of the shifting of the line or contour 16 with respect to the head 14 is effectively doubled. In addition, because both edges of the line or contour 16 are sensed, and their relative positions are compared, the effective result is the sensing of the center of the line and the width of the line becomes relatively unimportant.

The output from the bridge circuit is shown in FIG. 6 to be applied to an amplifier 61, and one output from the amplifier is applied to the head rotating motor 40 for turning the entire head 14. When the responses of the photocells 52 and 53 are equal, the amplifier 61 has no output and therefore the motor 40 remains stationary but when the photocells are unbalanced, the amplifier will cause rotation of the motor 40 in either one direction or the other by means of a phase shift so as to revolve the head 40 and thereby reorient the head in the sensed direction of the contour or line 16.

It should be pointed out that the window 44 in the masking plate 43 is spaced, in a direction parallel to the knife edge 49, from the rotation axis A, as is best seen in FIG. 5. The photocells 52 and 53 therefore effectively "view" a portion of the line or contour 16, which is spaced slightly ahead of the rotation axis of the head 14. The viewing by the photocells of a portion of the line 16 slightly ahead of the head-rotation axis A has the effect of causing the head to anticipate changes in the direction of the contour and furthermore, the degree of correction which is necessary in order to follow the contour is also anticipated. As hereinafter more fully pointed out, the relative movement between the head and the contour is also substantially reduced and at a time which will permit the head to closely follow the contour even though the direction of the contour changes abruptly.

Means are provided for controlling the direction of relative movement between the head and the glass plate 12 in response to the orientation of the head, and for proportionately reducing the rate of travel of the carriage 13 and plate 12 when abrupt changes in the direction of the contour are encountered. In the form shown, such means includes a pair of sinusoidal cams 62 and 63 secured to the tubular body member 36 and the gear 38a of head 14 and oriented at 90° out of phase with each other. Cam followers or rollers 64 and 65 respectively engage the peripheral surfaces of cams 62 and 63 and are mounted on reciprocable shafts 66 and 67 which are slidably mounted in bearings 68 and 69 respectively on the frame 35. Springs 66a and 67a encompass the shafts 66 and 67 and urge the followers 64 and 65 against the cam peripheral surfaces. A pair of ball-disc integrators or translation mechanisms, indicated in general by numerals 70 and 71 are provided for producing rotation of output shafts 72 and 73 respectively at speeds which vary in relation to the linear positions of the shafts 66 and 67. Although there are several ways of producing the desired rotation at the shafts 72 and 73, the ball-disc integrators 70 and 71 have been found to be satisfactory and are of a common design, shown diagrammatically (integrator 70) in FIG. 8. The integrator 70 includes a disc 70a which is driven from a variable speed A.C. series-wound motor 74 through a suitable gear train which includes a gear 70b for driving the disc 70a and which also includes a gear 71b for driving the corresponding disc in integrator 71. The control shaft 70c which is non-rotatable but which is reciprocable and is affixed as by a coupling 66b to the shaft 66 and is guided by a finger 75 in a stationary guideway 76 so as to be prevented from rotating, has a ball carriage 70d affixed thereto which carries a pair of rotatable balls 70e which engage each other and which respectively engage the surface of disc 70a and one side of the rotary output shaft 72. The shaft 70c is oriented to move the balls 70e along a diameter of the disc 70a so as to cause the output shaft 72 to vary in speed as the balls 70e engage the surface of the disc at different positions from the rotation axis. When the balls 70e are disposed at the center of the disc, no rotation is imparted to the shaft 72, but when the balls are disposed adjacent the outer periphery of the discs, the shaft 72 is driven at the maximum speed. A voltage-generating tachometer 77 has its rotor connected with the gear train which is driven by the motor 74 and as will be seen in connection with the description of FIG. 6, the output of the tachometer 77 is fed back into the series-wound variable speed motor 74 so as to prevent the motor 74 from running away. In regard to the speed of rotation of the output shafts 72 and 73, it should be noted that the rates of rotation of the shafts can be varied by changing the positions of the shafts 66 and 67, and may also be varied proportionately to each other by changing the speed of the driving motor 74.

The motor 74 is driven continuously from an electrical source through a speed control rheostat 79, a transformer 80 and an amplifier 81. It will be seen that the output of the tachometer is fed back into the amplifier to prevent the series-wound motor 74 from running away. The indications produced as a result of unbalance of the photocells 52 and 53 are also fed back through the amplifier 61, phase converter 82, rheostat 83 which is mechanically synchronized with the rheostat 79, and buck against the signal to amplifier 81, and thereby reduce the net signal through the amplifier 81 to the disc-driving motor 74 to reduce the speed of motor 74 when indications of unbalance are produced, and thereby proportionately reduce the speeds of the output shafts 72 and 73 of the integrators. It will be understood that the phase convertor 82 is necessary because the photocell signal changes phase to control direction of the head motor 40 and as a result the phasing must be eliminated so as to prevent reversing of the disc motor 74.

A pair of synchrocontrol systems are provided for controlling the rate at which the X-axis and Y-axis drive motors 24 and 33 respectively are to be driven in order to cause the head to follow along the contour 16. The synchrocontrol systems are similar to each other and include synchrotransmitters 85 and 86 having their rotors 85a and 86a respectively connected with the output shafts 72 and 73 of the integrators. The synchrotransmitters 85 and 86 respectively produce control signals which are applied to the control transformers 34 and 25 respectively, the rotors of which, as hereinbefore described, are respectively connected with the Y-axis and X-axis drive screws 29 and 20 respectively. The rotor coils of the control transformers 34 and 25 are respectively connected through amplifiers 87 and 88 to their corresponding Y-axis and X-axis of drive motors 33 and 24 for revolving the screws 29 and 20 at the designated rate of speed in relation to the control signal applied from the transmitters.

It should be particularly noted that the control signals which are applied to the control transformers 34 and 25 respectively may also be utilized for application to other slave machines such as is indicated by the symbols $M_y$ and $M_x$ relating to a first machine and possibly $P_x$ and $P_y$ of a second slave machine such as a cutting machine of some type for producing a part identical in shape to the contour 16.

*Operation*

In operation, a drawing is produced on light-pervious material such as vellum or the like and defining the contour of the outline to be traced. The drawing may be regarded as a template. The sheet of paper 15 is then secured to the glass plate 12 and the machine is set into operation to produce relative movement between the head and plate 12. It will be understood that even though the optical system of the head is not in sensing relation with the line 16, the photocells will be balanced so as to produce substantially linear movement between the head and plate 12. The direction of relative movement between the head and plate 12 at this stage is controlled by the push button switch 90 which shunts the bridge resistor 55 through a resistor 91 and which thereby causes rotation of the head which permits control of the direction of relative movement. Shortly, the head may be guided into sensing relation with the contour line 16, and when this occurs, the source of light 41 directs the beam of light upwardly through the paper 15, substantially in the manner shown in FIG. 7 and an image of a portion of the line 16 is directed upwardly to the masking plate 43, and the window 44 therein lets a portion of the image pass therethrough to be cast on the reflecting surfaces of the prism 46. If the width of the line image is centered in the window 44, the image will be split by the prism and two identical partial images are reflected to the photocells 52 and 53, creating a balanced condition in the bridge circuit. The head 14 will remain stationary because of the lack of a control signal on the motor 40. It will be understood that power is being supplied to the disc motor 74 so as to revolve the discs of the integrators 70 and 71. The output shafts 72 and 73, and the rotors 85a and 86a of synchrotransmitters 85 and 86 will be rotated at certain speeds which is controlled by the longitudinal position of shafts 66 and 67 respectively. The synchrotransmitters 85 and 86 are producing control signals proportional to the rates of travel which must be produced along the Y-axis and X-axis respectively so as to produce the necessary results in relative movement between the head and plate 12 as to cause the head to follow along the contour 16. The electric control signals produced by the synchrotransmitters 85 and 86 may be applied at $M_y$, $M_x$, $P_y$ and $P_x$ to other slave machines which are to follow the operation of the carriage 13 and plate 12 of the tracing machine 10. The control signals are applied to the Y-axis and X-axis control transformers 34 and 25 and if the rotors of the synchrotransmitters and the control transformers are in precise alignment, no signal is emitted from the control transformers. However, if the synchrotransmitters and control transformers are not in precise alignment, signals are emitted to the amplifiers 87 and 88 respectively which apply power to the Y-axis and X-axis drive motors 33 and 24 respectively to turn the screws 29 and 20. The screws 29 and 20 are driven at such speeds as to move the carriage 13 and plate 12 at such speeds as to move the head axis along the contour 16.

When the direction of the contour line 16 changes in the portion thereof being sensed, or in the field of view, the image of the line at the window 44 of the masking plate 43 will shift toward one side of the window and more light will be allowed to pass through the other side of the window 44. As a result, unequal quantities of light are reflected to the photocells 52 and 53. The resistances of both the photocells will change, and because, as seen in FIG. 6, change in resistance of either of the photocells would cause unbalance in the bridge circuit, the actual change in resistance of both photocells produces a doubling effect so as to produce a substantially larger indication of the unbalance. The unbalance of the bridge circuit has two immediate effects, the first being to cause the head 14 to revolve about its axis and the second is to slow down the disc motor 74 so as to slow the movement of the carriage 13 and glass plate 12. The signal produced by the unbalanced bridge circuit is applied through the amplifier 61 and a phase shift controls the direction of rotation of the head-driving motor 40. As the head is revolved back into alignment with the longitudinal direction of the sensed portion of line 16, the cams 62 and 63 are also rotated, and the shafts 66 and 67 are displaced in a longitudinal direction. Displacement of the shafts 66 and 67 causes the speeds of the output shafts 72 and 73 to vary individually. These changes of speed cause different control signals to be transmitted by the synchrotransmitters 85 and 86 so as to change the relative speeds of the Y-axis and X-axis screws 29 and 20 to thereby cause the carriage 13 and glass plate 12 to be moved at a different rate of travel and therefore the direction of relative movement between the head 14 and the template or line 16 is changed.

Substantially simultaneously with the displacement of the shafts 66 and 67, a portion of the signal from amplifier 61 is directed through the phase converter 82 and through the rheostat 83 so as to proportionately reduce the rotational speeds of the respective discs in the integrators 70 and 71 and thereby proportionately reduce the output speeds of the shafts 72 and 73. The speeds of the rotors of the synchrotransmitters 85 and 86 are proportionately reduced and the speeds of the screws 29 and 20 are also proportionately reduced so as to slow down the rate of travel of the head following along the contour line 16.

It will therefore be seen that when a change in the direction of the contour line is sensed, the resulting indication from the photocells causes reduction in the rate of travel between the head and contour line so as to allow the head to accurately follow the contour line around the bend or abrupt change in direction thereof. The slight offset in the position of window 44 with respect to the head rotation axis causes the reduction in velocities slightly before the turn must be made. As the head responds to the line direction indications, the axis of the head will closely follow the contour around the abrupt change in direction. After the direction of relative movement between the head 14 and template has been changed, the image of the line at the window 44 in the masking plate, will return to the center of the window and the partial images reflected into the photocells will again be identical to each other so as to again create a balanced condition in the bridge circuit and to stop the rotation of motor 40. When the balanced condition is again experienced at the bridge circuit, the disc motor 74 will again resume its original speed and the speeds of the screws 29 and 22 will be proportionately increased again so as to cause the head to follow along the contour at the desired rate.

It will be understood that the slave machines operating from the control signals produced by the synchrotransmitters 85 and 86 will also have X-axis and Y-axis drive mechanisms including the control transformers which are similar to the drive mechanisms of the present invention for moving the carriage 13 and glass plate 12.

It is also well to note that the width of the line 16 has substantially no relationship to the accurate following of the tracing machine along the line, because the image of the line will be split at the prism 46 and slightly narrower lines will merely allow slightly additional light to be reflected to the photocels which will still remain in balance with reference to the center of the line.

The present tracing machine permits a substantially faster layout of the part than has been possible with the use of previously known machines, and the part may be designed with simple pencil drafting techniques on conventional type paper. The tracing machine may follow at a relatively high rate of speed, the contour of the drawing or template so as to produce a rapid operation of the slave machine and the high rate of speed is not at all objectionable because the rate of speed is materially reduced at abrupt changes in the contour. It will be seen that the machine is fully automatic for following the contour and for controlling the slave machine and this will thereby substantially reduce labor costs and operator fatigue. Because the present machine senses both edges of the line being traced, and furthermore because of the slow down characteristics at abrupt changes in the contour, sharp corners in the contour can be traced with a high degree of accuracy regardless of whether the corners turn inwardly or outwardly. Furthermore it should be noted that back tracing can be accomplished along parallel closely spaced lines. It has been experienced that lines spaced by one thirty-second of an inch will not cause improper operation of the machine and the proper line will be followed.

The extreme accuracy of the machine is attributed, at least in part, to the construction whereby the machine is constantly correcting itself so that the head is positioned exactly above the center of the line.

In addition to the foregoing, it should be noted that the machine will trace equally as well from a template having translucent lines on opaque background.

It will, of course, be understood that various changes may be made in the form, detail, arrangement and proportion of the parts without departing from the scope of our invention which consists of the matter described herein and set forth in the appended claims.

What is claimed is:

1. A machine for tracing a contour displayed by a template, comprising a template-carrying support, a head rotatable about an axis intersecting the contour of the template, means mounting the support and head for relative movement with respect to each other, drive mechanism producing said relative movement for causing the head axis to follow along the contour, contour direction sensing means on the head and in sensing relation with the contour at a position in advance of the head axis, said sensing means producing contour direction indications, means responsive to said indications for rotating the head to the sensed direction of the contour, and means responsive to rotation of the head for operating said drive mechanism to change the direction of said relative movement, and cause the axis of the head to follow the contour, whereby sensing the contour in advance of the head axis result in anticipation of changes in the direction of the contour and also in the degree of direction necessary to follow the contour.

2. A machine for tracing a contour displayed by a template, comprising a template-carrying support, a head rotatable about an axis substantially intersecting the contour of the template, means mounting the support and head for relative movement with respect to each other, drive mechanism producing said relative movement for causing the head axis to follow along the contour, sensing means on the head optically sensing the direction of the contour and producing contour direction indications, said sensing means including masking means limiting the field of view to a section of the contour in advance of the head axis, means responsive to said indications for rotating the head to the sensed direction of the contour, means responsive to orientation of the head for producing control signals related to the orientation of the head, and means applying said control signals to the drive mechanism to change the direction of said relative movement and cause the axis of the head to follow the contour, whereby said sensing means anticipates change in direction of the contour and the degree of correction necessary to cause the head to continue along the contour, and said control signals may be applied to a slave machine.

3. A machine for tracing a contour displayed by a template, comprising a template-carrying support, a head rotatable about an axis substantially intersecting the contour of the template, means mounting the support and head for relative movement with respect to each other, drive mechanism producing said relative movement for causing the head axis to follow along the contour, contour direction sensing means on the head and in sensing relation with the contour at a position in advance of the head axis, said sensing means producing contour direction indications, means responsive to said indications for rotating the head to the sensed direction of the contour, means responsive to orientation of the head for producing individually variable electric control signals which vary in relation to the orientation of the head, additional means responsive to changes of said indications for proportionately reducing said control signals, and control means applying said control signals to the drive mechanism to change the direction of said relative movement when the control signals are individually varied and to reduce the rate of said relative movement when said signals are proportionately reduced, whereby the sensing means anticipate changes in the direction of the contour and also the degree of contour and causes the relative movement to reduce when abrupt changes in the contour are sensed to permit the head to easily follow along the contour.

4. A machine for tracing a contour displayed by a template, comprising a template-carrying support, a contour direction-sensing head in sensing relation with a portion of the contour of the template and producing indications of the sensed direction of the contour, means mounting the support and head for relative movement with respect to each other in multi-directions, drive mechanism producing said relative movement to facilitate following by the head along the contour, control means operating said drive mechanism to control said relative movement, means operating said control means in response to said indications and producing changes in the direction of said relative movement to cause the head to follow the contour, and means operating said control means in response to changes in said indications and reducing the velocity of said relative movement in response to abrupt changes in said indications and abrupt changes in direction of the contour to facilitate accurately following of the contour by the head.

5. A machine for tracing a contour display by a template, comprising a template-carrying support, a contour-direction sensing head in sensing relation with a portion of the contour of the template and producing indications of the sensed direction of the contour, means mounting the support and head for relative movement in multi-directions, reversible drive mechanisms producing said multi-directional relative movement to facilitate following by the head along the contour, means responsive to said indications and producing a plurality of individually variable control signals applied to said drive mechanisms and each of said control signals controlling rate of travel in a certain direction to cause the head to follow the contour, and means responsive to changes of said indications and proportionately reducing all of said signals to proportionately reduce rate of travel in all directions when an abrupt change in the direction of the contour is sensed whereby the head will accurately follow all portions of the template contour and said control signals may be applied to a slave machine.

6. A machine for tracing a contour displayed by a template, comprising a template-carrying support, a rotary sensing head movable about an axis substantially intersecting the contour of the template, means mounting the support and head for relative movement in multi-directions, reversible drive mechanisms producing said multi-directional movement to facilitate following by the head axis along the contour, contour-direction sensing means on the head and producing indications of the sensed direction of the contour, means responsive to said indications for rotating the head to the sensed direction of the contour, means responsive to orientation of the head and producing a plurality of control signals individually varying in relation to the orientation of the head, means applying said control signals to said drive mechanisms and each of said signals controlling the rate of travel in a certain direction to cause the head axis to follow the contour, and means responsive to changes of said indications and proportionately reducing all of said signals to proportionately reduce the rate of travel in all directions when an abrupt change in the direction of the contour is sensed, whereby the head axis will accurately follow all portions of the template contour.

7. A machine for tracing a contour displayed by a template, comprising a template-carrying support, a rotary sensing head movable about an axis substantially intersecting the contour of the template, means mounting the support and head for relative movement in multi-directions, reversible drive mechanisms producing said multi-directional relative movement to facilitate following by the head axis along the contour, contour-direction sensing means on the head and in sensing relation with a portion of the contour adjacent the head axis and said sensing means producing indications of the sensed direction of the contour in relation to the orientation of the head, means responsive to said indications for orienting the head in the sensed direction of the contour, means responsive to orientation of the head and producing a plurality of control signals varying individually in relation to the orientation of the head, means applying said control signals to said drive mechanisms and each of said signals controlling rate of travel in a certain direction to cause the head axis to follow the contour, and means responsive to changes of said indications and proportionately reducing all of said control signals to proportionately reduce the rate of travel in all directions when an abrupt change in the direction of the contour is sensed, the indications reducing when the head is oriented in the sensed contour direction to permit the control signals to be proportionately increased again to permit the resumption of normal rate of travel in all directions, whereby to facilitate accurate following along the contour.

8. A machine for tracing a contour displayed by a template, comprising a template-carrying support, a rotary sensing head movable about an axis substantially intersecting the contour of the template, means mounting the support and head for relative movement in multi-directions, reversible drive mechanisms producing said multi-directional relative movement to facilitate following by the head along the contour, contour-direction sensing means on the head and in sensing relation with a portion of the contour adjacent the head axis and said sensing means producing indications of the sensed direction of the contour in relation to the orientation of the head, means responsive to said indications for orienting the head in the sensed direction of the contour, a pair of rotary control signal-producing devices, a source of variable speed rotary power, means for varying the speed of said source in response to said indications, a pair of individually variable translation mechanisms connected with the source of rotary power and each of said translation mechanisms being connected with a respective signal-producing device for rotating the same, a pair of cam mechanisms connected with the head and each being connected with a respective translation mechanism to individually vary the speed of the corresponding signal-producing device and thereby vary the signal produced, said signals varying with respect to each other in relation to orientation of the head and said signals also varying proportionately to each other in response to said indications, and control means operating said drive mechanisms in response to said control signals and varying the rate of travel in respective directions in relation to said control signals to cause the head to follow along the contour.

References Cited in the file of this patent

UNITED STATES PATENTS

| 2,404,131 | Gieseke | July 16, 1946 |
| 2,419,641 | Hart | Apr. 29, 1947 |
| 2,423,440 | De Neergaard | July 8, 1947 |
| 2,499,178 | Berry et al. | Feb. 28, 1950 |

(Other references on following page)

UNITED STATES PATENTS

| | | | |
|---|---|---|---|
| 2,622,485 | Martellotti | Dec. 25, | 1952 |
| 2,723,845 | Przybylski et al. | Nov. 15, | 1955 |
| 2,853,626 | Wetzel | Sept. 23, | 1958 |
| 2,868,993 | Henry | Jan. 13, | 1959 |

FOREIGN PATENTS

| | | | |
|---|---|---|---|
| 136,066 | Australia | Jan. 26, | 1950 |

OTHER REFERENCES

Phillips: "Photoelectric Comparator for Measuring Oscillograms," The Review of Scientific Instruments, vol. 25, No. 10, October 1954, pages 971–976, page 971 relied upon.